(12) United States Patent
Son

(10) Patent No.: US 7,833,496 B2
(45) Date of Patent: Nov. 16, 2010

(54) PLATE TYPE PREFERENTIAL OXIDATION REACTOR

(75) Inventor: In-hyuk Son, Suwon-si (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 460 days.

(21) Appl. No.: 11/882,066

(22) Filed: Jul. 30, 2007

(65) Prior Publication Data

US 2008/0166277 A1    Jul. 10, 2008

(30) Foreign Application Priority Data

Jan. 9, 2007    (KR) .................. 10-2007-0002531

(51) Int. Cl.
*B01J 19/00*    (2006.01)
*F01N 3/00*    (2006.01)
*F01N 3/10*    (2006.01)

(52) U.S. Cl. .................. 422/198; 422/168; 422/173; 422/175; 422/176; 422/177; 422/180; 422/211; 422/219; 422/220

(58) Field of Classification Search .................. 422/198, 422/168, 173, 175, 176, 177, 180, 206, 211, 422/219, 220
See application file for complete search history.

(56) References Cited

U.S. PATENT DOCUMENTS

| | | | | |
|---|---|---|---|---|
| 2,574,142 A | * | 11/1951 | Buongirno .................. 165/77 |
| 7,261,866 B1 | * | 8/2007 | Kadowaki et al. ............ 422/198 |
| 2002/0131915 A1 | * | 9/2002 | Shore et al. .................. 422/177 |
| 2004/0038093 A1 | * | 2/2004 | Echigo et al. .................. 429/17 |
| 2004/0065013 A1 | * | 4/2004 | DeVries .................... 48/198.2 |
| 2005/0042151 A1 | * | 2/2005 | Alward et al. ................ 422/177 |
| 2006/0022065 A1 | | 2/2006 | Hagan et al. |
| 2006/0067863 A1 | * | 3/2006 | Wheat et al. ................. 422/198 |

FOREIGN PATENT DOCUMENTS

| | | |
|---|---|---|
| JP | 09-030801 | 2/1997 |
| JP | 2002-025597 | 1/2002 |
| JP | 2002-193602 | 7/2002 |
| JP | 2004-182494 | 7/2004 |
| JP | 2004-193013 | 7/2004 |
| KR | 10-2006-0065780 | 6/2006 |
| KR | 10-2006-0081729 | 7/2006 |
| KR | 10-2006-0096700 | 9/2006 |

OTHER PUBLICATIONS

*Notice of Allowance* from the KIPO issued in Applicant's corresponding Korean Patent Application No. 10-2007-0002531 dated Apr. 3, 2008.

* cited by examiner

*Primary Examiner*—Walter D Griffin
*Assistant Examiner*—Lessanework Seifu
(74) *Attorney, Agent, or Firm*—Robert E. Bushnell, Esq.

(57) ABSTRACT

The present invention provides a plate-shaped preferential oxidation (PROX) reactor. The plate-shaped PROX reactor of the present invention includes a plate-shaped chamber having an inlet to supply gas and an outlet to discharge fluid, a distributor for distributing gas supplied into the inlet, a main reactor having a catalyst for converting carbon monoxide contained in the gas into another material, and a radiator disposed on an outer surface of the chamber to dissipate heat.

16 Claims, 6 Drawing Sheets

PLATE TYPE PREFERENTIAL OXIDATION REACTOR

CLAIM OF PRIORITY

This application makes reference to, incorporates the same herein, and claims all benefits accruing under 35 U.S.C. §119 from an application for PLATE TYPE PREFERENTIAL OXIDATION REACTOR earlier filed in the Korean Intellectual Property Office on the 9 Jan. 2007 and there duly assigned Serial No. 10-2007-0002531.

BACKGROUND OF THE INVENTION

1. Field of the Invention

The present invention relates to a fuel processor, and more particularly to an air-cooling plate type preferential oxidation reactor capable of effectively removing carbon monoxide contained in reformed gas.

2. Description of Related Art

A fuel processor is a processor or system, which produces hydrogen from fuel. The fuel processor includes an apparatus for producing reformed gas by reforming fuel gas, and an apparatus for removing sulfur and/or carbon monoxide contained in the reformed gas. Hydrogen produced by the fuel processor is used for a power generation system such as a fuel cell etc.

The fuel cell, which is a non-polluting power supplying device, has been spotlighted as one of the clean energy power generation systems for the next generation. The power generation system using the fuel cell is used for an independent power generator of large sized buildings, power supplier of electric cars, portable power supplier etc., and it has the advantage of being capable of using various fuel such as natural gas, methanol, petroleum, liquefied petroleum gas (LPG), di-methyl ether (DME), coal, waste gas etc. The fuel cells are basically operated based on the same principle, and according to types of electrolyte used in the fuel cells, fuel cells can be categorized as phosphoric acid, alkaline, polymer electrolyte, direct methanol, and solid oxide fuel cells.

Among the above mentioned fuel cells, a polymer electrolyte membrane fuel cell (PEMFC) using polymer as electrolyte has no risk of the corrosion or evaporation by the electrolyte, and obtains high current density per unit area. Further, because the polymer electrolyte membrane fuel cell (PEMFC) has the advantage of a remarkably high output and a low operating temperature over other fuel cells, it has actively been developed for being applicable to a mobile power source for a portable electronic equipment, a transportable power source such as a power source for automobile, a distributed power source such as a stationary power plant used in a house and a public building, etc.

The polymer electrolyte fuel cell produces electric energy by an electrochemical reaction between hydrogen supplied to an anode and oxygen supplied to a cathode. Pure hydrogen, hydrogen generated from a metallic alloy that is capable of producing hydrogen gas, or hydrogen contained in reformed gas from fossil fuel can be used for the polymer electrolyte fuel cell. Pure oxygen or oxygen contained in the air can be used for the polymer electrolyte fuel cell. However, the pure oxygen or the metallic alloy for hydrogen storage is difficult to use because of high cost, which is caused by difficulties of manufacture, storage, and transportation. Accordingly, hydrogen-rich reformed gas that is generated from a fuel reformer is commonly used for hydrogen fuel of the fuel cell.

The fuel reformer includes a steam reforming (SR) reactor producing hydrogen-rich reformed gas by a reaction between fuel and steam, a partial oxidation (POX) reactor producing hydrogen-rich reformed gas by oxidizing fuel, and a reactor which combines the steam reforming reaction and the partial oxidation reaction. A carbon monoxide reducer includes a water gas shift (WGS) reactor and a preferential oxidation (PROX) reactor.

In general the PROX reactor removes carbon monoxide from reformed gas by using oxidizer, which has high carbon monoxide selectivity, after the reformed gas is mixed with air. Temperature of the reactor may be maintained in the range of 130° C. to 250° C., so that selectivity of an oxidation reaction is excellent and speed of the reaction is fast. However, it is difficult to maintain the range of temperature in the PROX reaction, because the PROX reaction is an exothermic reaction generating heat. Also, it is difficult to maintain uniform reaction temperature in the PROX reactor, because of temperature difference that is generated along the direction of flow of the reformed gas. Accordingly, it is difficult to uniformly control the oxidation reaction in the PROX reactor. Therefore it is necessary to prevent temperature variation and to maintain the temperature in a predetermined range. Otherwise, performance deteriorates depending on the range of temperature in the PROX reactor.

If a high temperature hot spot is generated in a catalyst layer of the PROX reactor, activity of the catalyst positioned in the hot spot deteriorates rapidly, and the hot spot spreads over the catalyst layer. Thereby activity of the catalysts in the reactor deteriorates rapidly.

SUMMARY OF THE INVENTION

One of objectives of the present invention is to provide a new plate type preferential oxidation (PROX) reactor, which is capable of maintaining optimum temperature in a natural cooling manner and according to a catalyst property. Therefore, carbon monoxide (CO), which is a major cause for poisoning of a low temperature membrane electrode assembly (MEA), is effectively removed in reformed gas.

According to an aspect of the present invention to achieve the above technical subject, there is provided a PROX reactor that includes a plate-shaped chamber having a front, a back, and a side wall interconnecting the front and the back, an inlet formed at the front of the chamber for supplying an incoming material into the chamber, an outlet formed at the back of the chamber for discharging a material from the chamber, a main reactor disposed inside the plate-shaped chamber, a catalyst formed inside the main reactor, a distributor formed inside the plate-shaped chamber, and a radiator provided on an outer surface of the plate-shaped chamber. The main reactor converts carbon monoxide contained in the incoming material into another material. The catalyst promotes the conversion of carbon monoxide of the incoming material into the another material. The distributor is formed between the inlet and the main reactor, and the distributor guides flow of the incoming material supplied through the inlet into the main reactor.

The radiator may be provided closer to the back of the chamber than the front of the chamber. The radiator may have a shape of a swept wing with a predetermined sweep angle. The swept wing sweeps along a direction from the inlet to the outlet. The radiator may include a plurality of protrusions. The protrusions are aligned along a direction from the inlet to the outlet. The heights of protrusions sequentially increase along the direction from the inlet to the outlet. The radiator can be made of aluminum.

A cross-sectional area of the side wall of the chamber may decrease as approaching to each of the front and the back of the chamber. The chamber may be made of aluminum.

The chamber may further include a first chamber including the front of the chamber and a second chamber including the back of the chamber. The first chamber may have a first opening at the opposite side of the front. A first flange is formed on a circumference of the first opening. The second chamber may have a second opening at the opposite side of the back. A second flange is formed on a circumference of the second opening. The second flange is coupled to the first flange. The chamber may further include a gasket interposed between the first flange and the second flange.

The main reactor may have a honeycomb shaped supporter coated with the catalyst. The catalyst may be coated inside of the main reactor in slurry. The catalyst may be packed in the main reactor in a bead shape. The catalyst can be formed of a precious metal catalyst selected from the group consisting of platinum, ruthenium, rhodium, and combinations thereof. The catalyst can be formed of a cocatalyst being selected from the group consisting of cerium, iron, manganese, and combinations thereof. The catalyst can be formed by soaking a cocatalyst in a base metal where the cocatalyst can be selected from the group consisting of cerium, iron, manganese, and combinations thereof. The catalyst can be formed by using an oxide container.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, certain exemplary embodiments according to the present invention will be described with reference to the accompanying drawings.

Figure 1A:
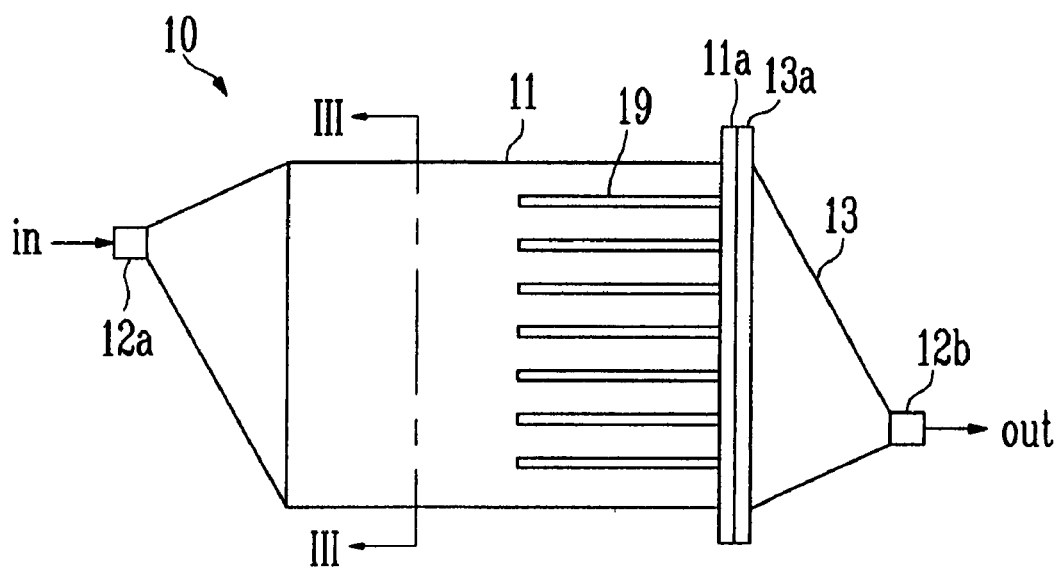
FIG. 1A illustrates a front view of a plate-shaped preferential oxidation (PROX) reactor constructed as an embodiment of the present invention.
Figure 1B:
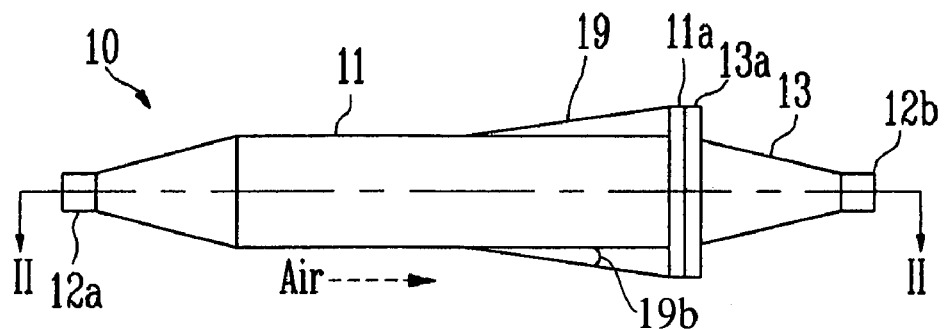
FIG. 1B illustrates a plane view of FIG. 1A.
Figure 1C:
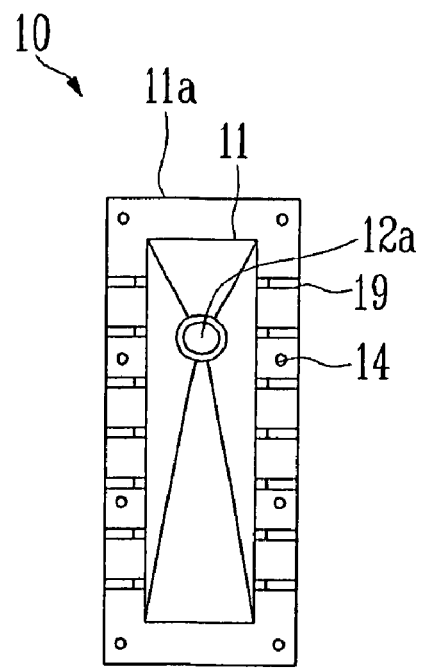
FIG. 1C illustrates a left side view of FIG. 1A.
Figure 1D:
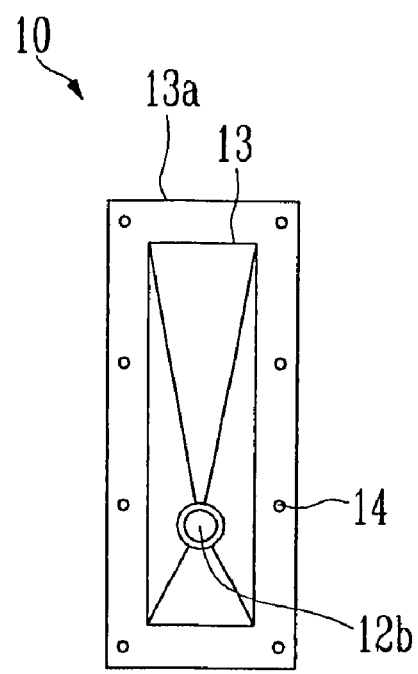
FIG. 1D illustrates a right side view of FIG. 1A.
Figure 2:
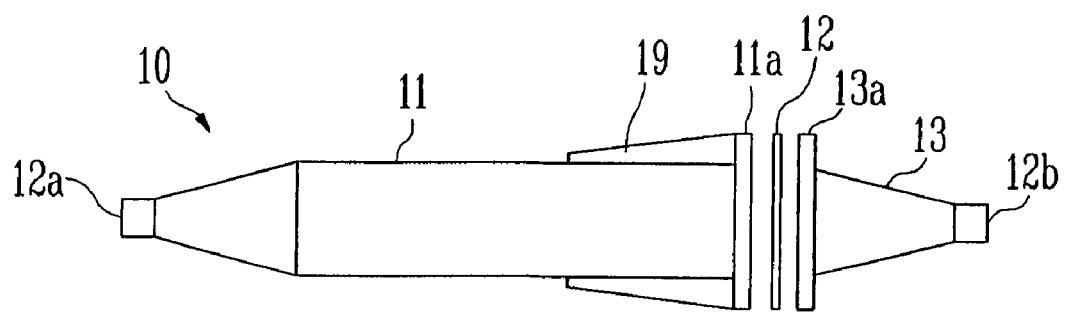
FIG. 2 illustrates a schematically exploded view of the plate-shaped PROX reactor constructed as an embodiment of the present invention.

FIG. 1A is a front view of a plate-shape preferential oxidation (PROX) reactor, which is constructed as an embodiment of the present invention. FIG. 1B is a plane view of the PROX reactor shown in FIG. 1A when viewed from the top. FIG. 1C is a left side view of the PROX reactor shown in FIG. 1A. FIG. 1D is a right side view of the PROX reactor shown in FIG. 1A.

Referring to FIG. 1A to 1D, plate-shape PROX reactor 10 includes a chamber and radiator mounted on an outer surface of the chamber. Plate-shape PROX reactor 10 of the present invention includes a radiator that effectively controls temperature gradient produced in the entire reactor during a preferential oxidation reaction.

The chamber has a front (or a front side), a back (or a back side), and a side wall formed perpendicular to the front and the back. The side wall interconnects the front and the back. Inlet 12a is formed at the front to supply fluid or gas into the chamber, and outlet 12b is formed at the back to discharge fluid or gas from the chamber. The gas or fluid supplied through inlet 12a can be referred to as an incoming material, and the gas or fluid being discharged through outlet 12b can be referred to as an outgoing material. Each of the front and the back of the chamber has an upper portion and a lower portion. The upper and lower portions are defined as relative positions to each other. Therefore as shown in FIG. 1A, inlet 12a is formed on the upper portion of the front of the chamber, and outlet 12b is formed on a lower portion of the back of the chamber.

The side wall has a shape of a tube or a plate with a longitudinal direction from the front to the back of the chamber. Herein, a cross-section of the side wall is defined as a surface cut perpendicular to the longitudinal direction. Therefore the surface of the cross-section can be substantially parallel to the front side and the back side. A cross-sectional area of the side wall is defined as an area of the cross-section of the side wall. Herein, a plate-shaped chamber is defined as a chamber that has a side wall that has a cross-section of a flattened shape. The examples of the flattened shape includes a rectangle, which is a flattened shape of a square, and an ellipse, which is a flattened shape of a circle. Therefore, the plate-shaped chamber can have a rectangular cross-section or an elliptical cross-section. The plate-shaped chamber also can have an irregular shape that can be driven from the rectangle or the ellipse.

In more detail, the chamber includes body 11 having a space inside and cover 13. Inlet 12a to supply an incoming material into the chamber is provided on one side of body 11 (the front of the chamber), and outlet 12b to discharge an outgoing material from the chamber is disposed on one side of cover 13 (the back of the chamber). Body 11 has a first opening at the opposite side of the front of the chamber, through which inner space of body 11 is exposed. First flange 11a is provided on a circumference of the first opening. Cover 13 has a second opening at the opposite side of the back of the chamber. Second flange 13a is provided on a circumference of the second opening.

The cross-sectional area of the side wall of the chamber decreases as approaching to each of the front of the chamber and the back of the chamber. In this case, cover 13 can have a shape of a funnel with a wide opening at the second opening and a narrow opening at the location of outlet 12b.

Outlet 12b of the chamber is provided on a lower portion of the back of the chamber. Therefore, a liquid material inside the chamber can flow smoothly through outlet 12b by the help of gravity.

Body 11 and cover 13 are preferably made of homogeneous material, for example aluminum. When the aluminum, which has high heat transfer and low side reaction, is used, a cooling effect of PROX reactor 10 may be improved.

Body 11 and cover 13 are coupled to each other through first flange 11a and second flange 13a. Specifically, body 11 and cover 13 are bonded to each other by welding bonding part 14 of first flange 11a and second flange 13a, as shown in FIG. 1C. Gasket 12 is interposed between first flange 11a of body 11 and second flange 13a of cover 13 to prevent leak of material contained in the chamber.

As shown in FIG. 1B, radiator 19 is provided on an outer surface of body 11 at a location closer to outlet 12b than inlet 12a. The incoming material flows from inlet 12a to outlet 12b, which is herein defined as a flow direction of a material. Therefore radiator 19 is formed in the latter part of the flow in the chamber. In one embodiment, radiator 19 is formed in a wing shape, more specifically in a swept wing shape. As shown in FIG. 1B, the wing of radiator 19 sweeps along the flow direction. In other words, in the swept wing shape, the wingspan of radiator 19 increases as proceeding along the flow direction. Sweep angle 19b of the wing of radiator 19 is defined as an angle between a line drawn along the edge of the wing and a line drawn along the outer surface of body 11. The sweep angle of the wing of radiator 19 can be determined by overall dimension of body 11, the size of first flange 11a, and efficiency of the heat dissipation.

Radiator 19 can have a plurality of wings as shown in FIG. 1A. In this case each of the wing of the plurality of wings can be made of the same material, and also can be made of the same material of body 11 such as aluminum. Radiator 19 is bonded to outer surface of body 11 by welding etc. Particularly, if there is a fan around PROX reactor 10, a radiating effect of the wing shaped radiator may be improved by forming the flow of air around radiator 19 and the chamber.

Body 11 and cover 13 included in the chamber also can be combined by a coupling means such as bolt and nut, clamp etc.

Figure 3:
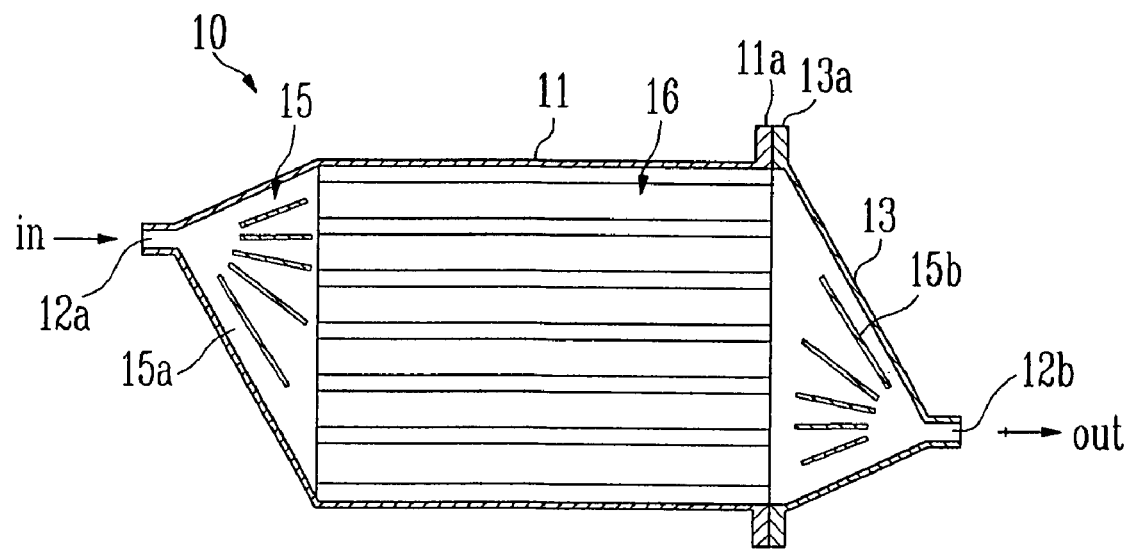
FIG. 3 illustrates a cross-sectional view taken along line II-II in FIG. 1B.

FIG. 3 is a cross-sectional view of the plate-shaped preferential oxidation (PROX) reactor taken along line II-II as shown in FIG. 1B, which is constructed as an embodiment of the present invention. Referring to FIG. 3, plate-shaped PROX reactor 10 of the present invention includes a distributor 15 for distributing fluid supplied from inlet 12a into main reactor 16 to induce an uniform and effective reaction of the fluid in the main reactor 16. Plate-shaped PROX reactor 10 according to the embodiment has a structure for effectively distributing fuel to main reactor that is disposed in a tube shape in PROX reactor 10.

Distributor 15 evenly distributes and provides reformed gas and air flowing through inlet 12a into main reactor 16, so that the preferential oxidation reaction is uniformly performed in main reactor 16. In other words, distributor 15 distributes the gas, moving into upper portion and lower portion in main reactor 16, with uniform and predetermined pressure. Distributor 15 includes incoming distributor 15a and outgoing distributor 15b. Incoming distributor 15a is disposed between inlet 12a and main reactor 16 to guide a incoming material into main reactor 16. Outgoing distributor 15b is disposed between main reactor 16 and outlet 12b to guide the material discharged from main reactor 16 into outlet 12b. In one embodiment, incoming distributor 15a can have a partition that divides the inner space of the chamber between inlet 12a and main reactor 16. Outgoing distributor 15b also can have a partition that divides the inner space of the chamber between main reactor 16 and outlet 12b. The partition can be formed as a protrusion protruded from inner surface of body 11. In another embodiment, incoming distributor 15a or outgoing distributor 15b can be formed as a lattice structure that has a plurality of distribution holes, through which a material can flow. The distribution holes can be designed to guide the material into main reactor 16 or outlet 12b.

Preferential oxidation reaction, which is performed in main reactor 16, reduces concentration of carbon monoxide contained in a reformed gas by a selective exothermic reaction between carbon monoxide in the reformed and oxygen in the air. For example, main reactor 16 reduces the concentration of carbon monoxide below about 10 ppm. A catalyst for the preferential oxidation reaction is disposed in the inside of main reactor 16.

Carbon monoxide reaction performed in main reactor 16 is represented as the follow reaction formula.

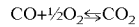

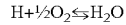  Reaction Formula 1

As shown in Reaction Formula 1, air and a reformed gas are supplied through inlet 12a. Oxygen is required for selective oxidation reaction of carbon monoxide contained in the reformed gas in the preferential oxidation reaction, and therefore, air is supplied together with the reformed gas.

Figure 4:
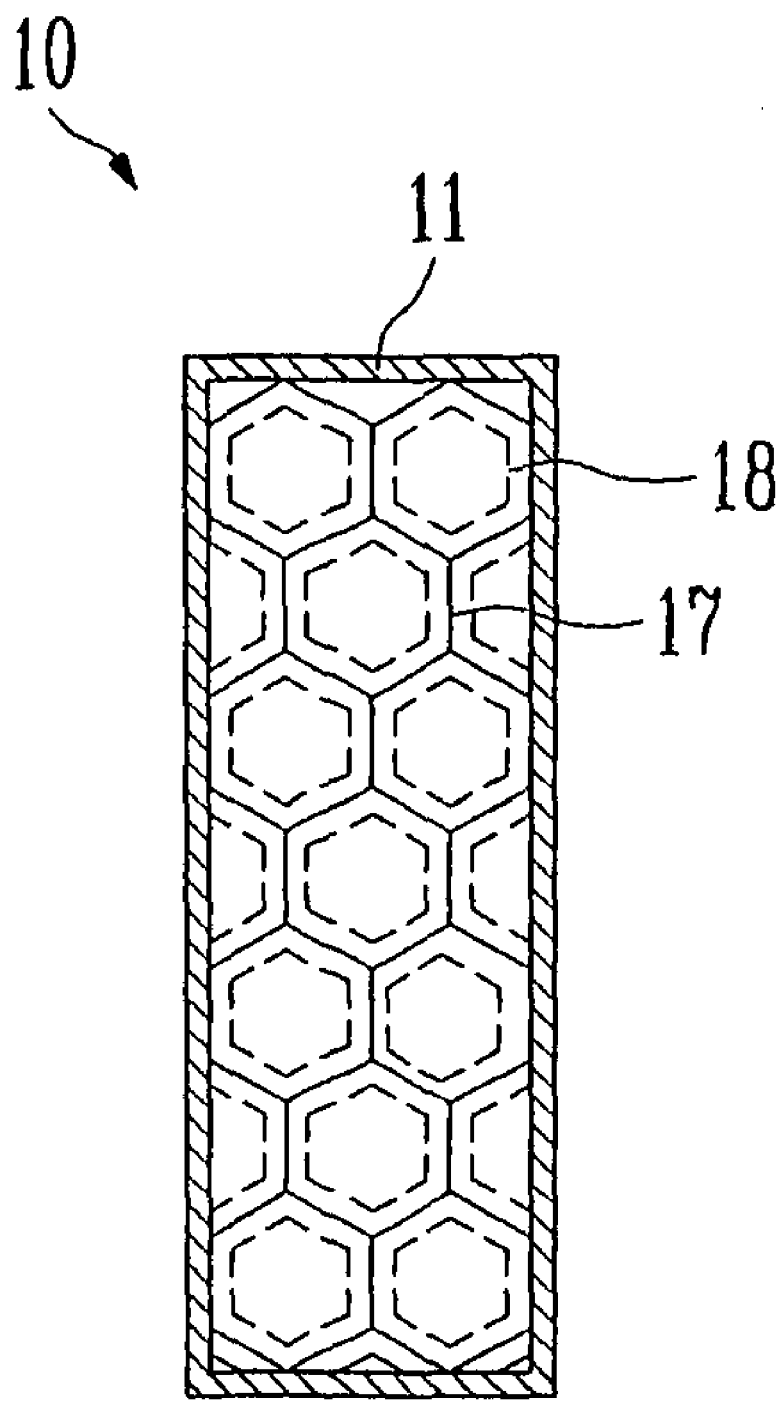
FIG. 4 illustrates a cross-sectional view taken along line III-III in FIG. 1A.

FIG. 4 is a cross-sectional view of the plate-shaped PROX reactor taken along line III-III shown in FIG. 1A. Referring to FIG. 4, the main reactor of PROX reactor 10 is formed as honeycomb shaped supporter 17 that is disposed in the inner space of body 11. Supporter 17 increases a PROX reaction area at a given volume of the reactor. Catalyst 18 is disposed in surface of supporter 17. Supporter 17 is implemented in body 11 or inserted into the inner space of body 11 after manufactured separately. Honeycomb shaped supporter 17 has a wider surface area than a round shaped supporter which has the same size as the honeycomb shaped supporter, so it is easy to dissipate heat and effective to have uniform temperature gradient.

Ruthenium (Ru), rhodium (Rh), platinum (Pt), titanina ($TiO_2$), $Pt/Al_2O_3$, $ZrO_2$, $Au/Fe_2O_3$ or etc. is used for catalyst 18. For example, catalyst 18 is implanted by using a catalyst which is at least one of precious metal catalysts such as platinum, ruthenium or rhodium with a cocatalyst which is cerium (Ce), iron (Fe) or manganese (Mn) or etc. which is easy to supply oxygen.

Also, catalyst 18 can be implemented by using a catalyst which is a base metal such as copper (Cu), chrome (Cr) or etc. with a cocatalyst which is cerium, iron, manganese or etc. or by using a catalyst which is an oxide carrier such as alumina, titanina ($TiO_2$) or etc. The inside of the main reactor or the honeycomb shaped supporter is coated with the manufactured catalyst 18 in a slurry type.

According to the above mentioned structure, the reformed gas and oxygen supplied into the reactor flow into the honeycomb shaped main reactor, and perform the PROX reaction by the catalyst of the main reactor. Heat generated by acceleration of the reaction along the catalyst layer is radiated into the air through the radiator provided on an outer wall of the reactor. Temperature of the reactor is maintained less than about 200° C.

It is possible to have PROX reactor 10 to maintain optimum reaction temperature with the distributor and the wing shaped radiator. The distributor uniformly distributes the reformed gas supplied into the inside of the reactor in order to uniformly maintain the temperature which is optimized to the catalyst property. The wing shaped radiator provided on the outer surface of the chamber of PROX reactor 10 uniformly dissipates heat generated from the main reactor. According to the present invention, high activity and selective plate shaped PROX reactor increases surface area by about 30% when compared with a contemporary plug flow reactor (PFR) which has common round structure.

Figure 5A:
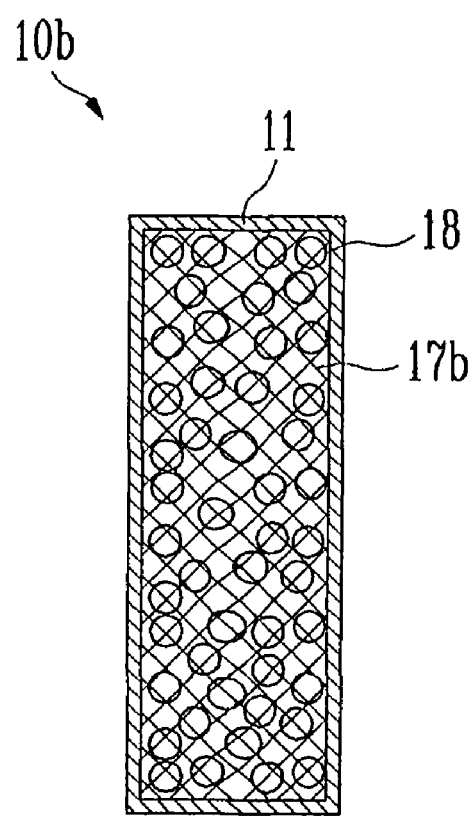
FIGS. 5A and 5B illustrate the plate-shaped PROX reactor constructed as another embodiment of the present invention.
Figure 5B:
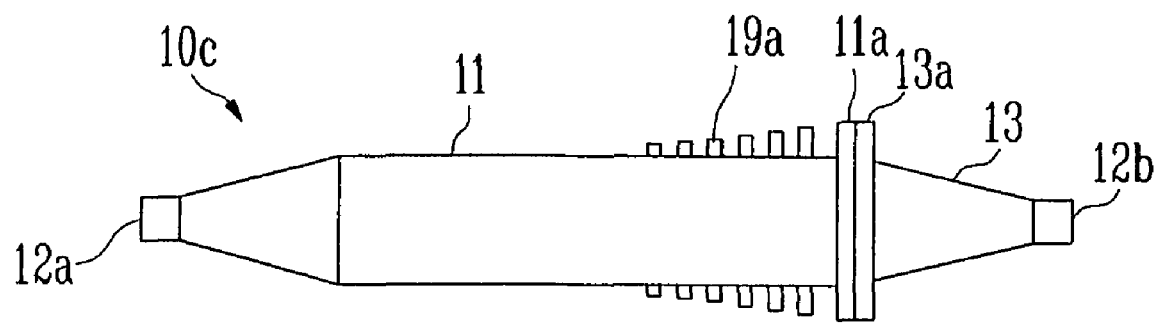

FIGS. 5A and 5B illustrate the plate-shaped PROX reactor constructed as another embodiment of the present invention. Referring to FIG. 5A, bead shaped catalyst 18 in the main reactor of plate-shaped PROX reactor 10a is used in another embodiment of the present invention. Bead shaped catalyst 18 is packed in the inner space of body 11 included in the main reactor. Reticular formation 17b is disposed in the inner space of body 11 in order to confine bead shaped catalyst 18 and in order to prevent bead shaped catalyst 18 from being scattered.

The plate-shaped PROX reactor of the present invention may be implemented not only with the catalyst layer coated honeycomb shaped supporter or the bead shaped catalyst layer, but also with a catalyst layer coated on a plurality of the inside boards dividing the inside space of body 11.

Referring to FIG. 5B, radiator 19a is formed with a plurality of the protrusions. The protrusions are aligned along the flow direction, which is a direction from inlet 12a to outlet 12b. The Heights of the protrusions increase sequentially as proceeding along the flow direction. The height, herein, is defined as a length between the base of the protrusion that contacts body 11 and the tip of the protrusion that is stretched from the base. Radiator 19a formed with a plurality of the protrusions is disposed in both sides of body 11 of the chamber with a multilayer structure as similar to the wing shaped radiator 19 shown in FIGS. 1A and 1B. The same material as body 11, or a material having higher thermal conductivity than body 11 may be used for the protrusions. Also, the protrusions may protrude in a body from the body 11 or be bonded to the body 11 by welding separated agents.

Figure 6:
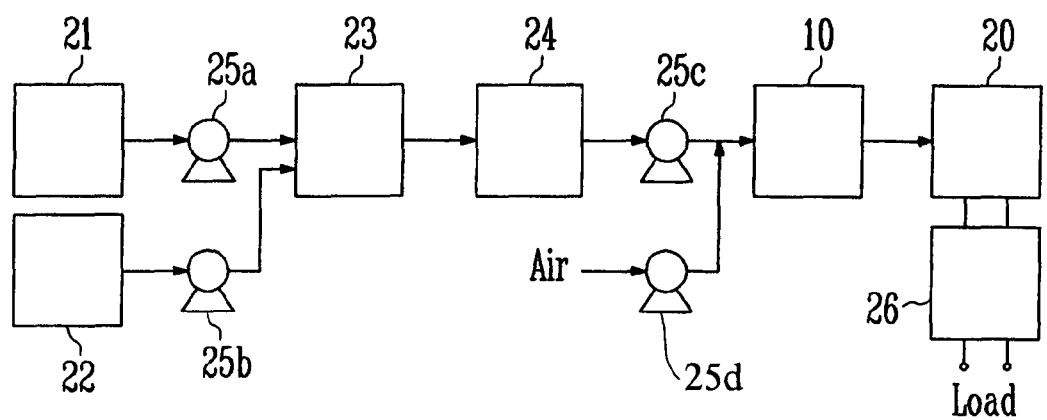
FIG. 6 illustrates a block diagram of a fuel cell system using the PROX reactor of the present invention.

FIG. 6 is a block diagram of a fuel cell system using the PROX reactor of the present invention. Referring to FIG. 6, the fuel cell system according to the embodiment includes fuel tank 21, water tank 22, fuel reformer 23, water gas shift reactor (WGS) 24, power converter 26, and PROX reactor 10.

Fuel reformer 23 receives fuel from fuel tank 21 through first pump 25a, and water from water tank 22 through second pump 25b. Fuel reformer 23 is preferably a steam reformer converting fuel and water into a hydrogen-rich reformed gas at high temperature. Here, fuel reformer 23 includes an evaporator preheating and mixing fuel and water, a steam reforming reactor and heater supplying heat to the evaporator and/or the steam reforming reactor.

WGS reactor 24 reduces a concentration of carbon monoxide contained in the reformed gas supplied from fuel reformer 23. A shift catalyst generating hydrogen and carbon dioxide by reaction between carbon monoxide contained in the reformed gas and water is packed in WGS reactor 24. More than one or two selected from copper, iron, chrome, and zinc (Zn) soaked in an alumina or zirconium dioxide container is used for the shift catalyst. Although not shown in FIG. 6, temperature of the reformed gas from WGS reactor 24 is preferably lowered to below 100° C. through a heat exchanger or a condenser.

PROX reactor 10 is the above mentioned PROX reactor of the present invention, and converts carbon monoxide contained in the reformed gas supplied from WGS reactor 24 through third pump 25c into carbon dioxide by an selective exothermic reaction between the carbon monoxide and air supplied though fourth pump 25d. The air supplied through fourth pump 25d preferably includes oxygen which is once to three times as concentration as carbon monoxide contained in the reformed gas.

Fuel cell 20 is preferably a polymer electrolyte membrane fuel cell having an anode electrode, a cathode electrode and a polymer electrolyte membrane interposed between an anode electrode and a cathode electrode. Fuel cell 20 produces electric energy by an electrochemical reaction between the hydrogen-rich reformed gas supplied to the anode electrode from PROX reactor 10 and air supplied to the cathode electrode from PROX reactor 10.

Power converter 26 converts the electric energy produced from fuel cell 20 into proper voltage and/or current form and transfers them to the load. Power converter 26 is implemented by an analog digital converter, a digital analog converter, DC-DC converter and compound thereof.

The PROX reactor of the present invention does not need a separate means for controlling temperature since it has a distributing structure for uniform distribution of the reformed gas flowed in and a radiating structure of a natural radiating manner. Therefore, the PROX reactor has the advantage of obtaining optimum activity and yield for the PROX reaction.

As mentioned above, there may be provided the plate-shaped PROX reactor maintaining an optimum temperature atmosphere and having high heat transfer and low side reaction production according to the present invention. And, activity and yield for a preferential CO oxidation reaction are optimized by distributing the reformed gas flowed in and effectively controlling reaction temperature of the distributed reformed gas in the flow of gas.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A preferential oxidation reactor comprising:
a plate-shaped chamber having a front, a back, and a side wall interconnecting the front and the back;
an inlet formed at the front of the chamber, the inlet supplying an incoming material into the chamber;
an outlet formed at the back of the chamber, the outlet discharging a material from the chamber;
a main reactor disposed inside the plate-shaped chamber, the main reactor converting carbon monoxide contained in the incoming material into another material;
a catalyst formed inside the main reactor, the catalyst promoting the conversion of carbon monoxide of the incoming material into the another material;
a distributor formed inside the plate-shaped chamber, the distributor formed between the inlet and the main reactor, the distributor guiding flow of the incoming material supplied through the inlet into the main reactor; and
a radiator provided on an outer surface of the plate-shaped chamber, the radiator being provided closer to the back of the chamber than the front of the chamber, the radiator having a shape of a swept wing with a predetermined sweep angle, the swept wing sweeping along a direction from the inlet to the outlet.

2. The preferential oxidation reactor according to claim 1, comprised of the radiator including a plurality of protrusions, the protrusions being aligned along a direction from the inlet to the outlet, the heights of protrusions sequentially increasing along the direction from the inlet to the outlet.

3. The preferential oxidation reactor according to claim 1, comprised of the radiator made of aluminum.

4. The preferential oxidation reactor according to claim 1, comprised of the distributor including a plurality of distribution holes.

5. The preferential oxidation reactor according to claim 1, wherein the inlet is positioned at an upper portion of the front of the chamber, while the outlet is positioned at a lower portion of the back of the chamber.

6. The preferential oxidation reactor according to claim 1, wherein a cross-sectional area of the side wall of the chamber decreases as approaching to each of the front and the back of the chamber.

7. The preferential oxidation reactor according to claim 1, comprised of the chamber comprising:
- a first chamber including the front of the chamber, the first chamber having a first opening at the opposite side of the front, a first flange formed on a circumference of the first opening; and
- a second chamber including the back of the chamber, the second chamber having a second opening at the opposite side of the back, a second flange formed on a circumference of the second opening, the second flange being coupled to the first flange.

8. The preferential oxidation reactor according to claim 7, further comprising a gasket interposed between the first flange and the second flange.

9. The preferential oxidation reactor according to claim 1, comprised of the chamber being made of aluminum.

10. The preferential oxidation reactor according to claim 1, wherein the main reactor has a honeycomb shaped supporter coated with the catalyst.

11. The preferential oxidation reactor according to claim 1, wherein the catalyst is formed inside of the main reactor.

12. The preferential oxidation reactor according to claim 1, wherein the catalyst is packed in the main reactor in a bead shape.

13. The preferential oxidation reactor according to claim 1, wherein the catalyst is formed of a precious metal catalyst selected from the group consisting of platinum, ruthenium, rhodium, and combinations thereof.

14. The preferential oxidation reactor according to claim 1, wherein the catalyst includes a cocatalyst being selected from the group consisting of cerium, iron, manganese, and combinations thereof.

15. The preferential oxidation reactor according to claim 1, wherein the catalyst is formed by soaking a cocatalyst in a base metal, the cocatalyst being selected from the group consisting of cerium, iron, manganese, and combinations thereof.

16. The preferential oxidation reactor according to claim 1, wherein the catalyst is formed by using an oxide container.

* * * * *